United States Patent [19]

Darling et al.

[11] 4,360,535

[45] Nov. 23, 1982

[54] ARTIFICIAL CREAM COMPOSITION AND METHOD OF PREPARATION

[75] Inventors: Donald F. Darling, Eaton Socon; Eric Dicks, Grays, both of England

[73] Assignee: Lever Brothers Company, New York, N.Y.

[21] Appl. No.: 327,662

[22] Filed: Dec. 4, 1981

Related U.S. Application Data

[63] Continuation of Ser. No. 210,070, Nov. 24, 1980, which is a continuation of Ser. No. 13,633, Feb. 21, 1979.

[30] Foreign Application Priority Data

Feb. 17, 1978 [GB] United Kingdom ............... 6399/78

[51] Int. Cl.³ .................... A23C 11/04; A23L 1/19
[52] U.S. Cl. .................................. 426/570; 426/602
[58] Field of Search .............. 426/564, 569, 570, 572, 426/601, 602, 613, 604, 633, 654

[56] References Cited

U.S. PATENT DOCUMENTS

| | | | |
|---|---|---|---|
| 3,144,341 | 8/1964 | Thompson | 426/601 X |
| 3,199,988 | 8/1965 | Kozlik et al. | 426/572 X |
| 3,228,772 | 1/1966 | Buddemeyer et al. | 426/601 X |
| 3,479,190 | 11/1969 | Ganz | 426/572 X |
| 3,695,889 | 10/1972 | Ingerson | 426/602 X |
| 3,840,682 | 10/1974 | Kubota et al. | 426/602 X |
| 3,903,310 | 9/1975 | Buide et al. | 426/602 X |
| 3,924,018 | 12/1975 | Sims et al. | 426/564 |
| 4,146,652 | 3/1979 | Kahn et al. | 426/564 |

FOREIGN PATENT DOCUMENTS

| | | |
|---|---|---|
| 1066703 | 4/1967 | United Kingdom . |
| 1256053 | 12/1971 | United Kingdom . |
| 1500427 | 2/1978 | United Kingdom . |

OTHER PUBLICATIONS

Knightly, W. H., The Role of Ingredients in the Formulation of Whipped Toppings, Food Technology, vol. 22, Jun. 1968, pp. 73–86.

*Primary Examiner*—Robert A. Yoncoskie
*Attorney, Agent, or Firm*—Irving N. Feit; James J. Farrell

[57] ABSTRACT

Artificial creams essentially free from milk proteins are particularly suitable as coffee creams and comprise an emulsion of edible fat, especially containing up to about 30% lauric fat, with an emulsifier system comprising a mixture of lecithin with selected nonionic and an ionic emulsifier preferably having a predetermined range of HLB activity.

8 Claims, No Drawings

ARTIFICIAL CREAM COMPOSITION AND METHOD OF PREPARATION

This is a continuation of application Ser. No. 210,070, filed Nov. 24, 1980 which is a continuation of Ser. No. 013,633 filed Feb. 21, 1979.

INTRODUCTION

The general high cost of dairy products is reflected in the cost of dairy cream and presents an obvious business opportunity in producing a cream substitute both for the housewife and for the industrial user.

A basic product concept has been developed to fulfill the following requirements:
1. The cream must be a stable liquid emulsion approximate in colour and flavour to a middle fat level cream i.e. between single and double cream.
2. The cream must perform well as a coffee whitener without excessive oiling-out or surface precipitation.
3. The cream must be capable of being whipped on various mechanical whipping machines to at least twice its volume with a discernible end point.
4. The cream must be usable as a dairy cream substitute in a variety of cooking recipes.
5. The product must be able to withstand changes of temperature during the distribution system.
6. The cream must be free from dairy derivates so that it might be termed non-dairy cream.

TECHNICAL BACKGROUND

Artificial creams intended for the above purposes have traditionally been made with the inclusion of protein derived from milk either as spray-dried milk powder or sodium caseinate. Protein has a multi-purpose function in these systems:
1. Proteins act as an emulsifier by being absorbed at the oil/water interphase and thus preventing agglomeration of fat droplets after homogenisation.
2. They impart body to the cream.
3. They provide some whitening powder when used in the coffee whitener function.
4. They impart flavour to the cream.

It can be seen that the production of a multifunctional liquid cream becomes a complicated task when protein is eliminated. This is primarily due to the fact that the basic functional requirements of a liquid coffee creamer and of a whippable cream are, at least partially, mutually exclusive. On whipping, the emulsion partially destabilises to give agglomerated fat globules forming a network within the foam lamellae. However, this destabilisation must only occur during high shear, i.e. whipping, otherwise the product will be unstable in the liquid form during the distribution cycle.

The protein function has been replaced in bakery creams by methylethylcellulose. Here the degree of substitution of the cellulose molecule enables the compound to be absorbed at the interface and give a stable liquid. This, as in the case of protein, is overcome during high shear allowing fat agglomeration and therefore stable whipped cream. Unfortunately methylethylcellulose is insoluble in hot water and thus precipitates in hot coffee to give a white surface scum.

The main objective was therefore to discover a blend of emulsifiers and stabilisers which would allow for the manufacture of a stable liquid which perform all the functions previously outlined without the use of protein.

Where protein is present the functions of other emulsifiers added to whipping creams is to give a good volume to the whip, modify the foam texture and provide stability against syneresis. The standard emulsifiers used are lipophilic and include various monoglycerides, and the alpha-tending emulsifiers e.g. propylene glycol monostearate, acetylated monoglycerides and lactylated monoglycerides. These alpha-tending emulsifiers form a rigid alpha-crystalline film on the surface of the fat globules and promote fat agglomeration during whipping when the stabilising protein is disrupted by high shear.

In the absence of protein the use of the above emulsifiers is counter-productive in allowing fat coalescence in the liquid phase and therefore instability. Using the range of permitted emulsifiers various combinations have been tried in order to produce a stable liquid emulsion which is whippable to a defined peak. It has been found that a combination of Tween 60, sodium stearoyl lactylate and soya lecithin in the ratio of 3:3:1 will give a stable liquid emulsion, particularly where the apparent HLB (Hydrophile-Lypophile Balance) is 8–9. The stability of this product appears to be due to the fact that sodium stearoyl lactylate is anionic and charge repulsion at the oil droplet surface prevents agglomeration. A stabilised cream with the above emulsifier balance at a total level of 0.35% will whip a mechanical whippable machine to a light spoonable cream. The firmness/definition of the whipped product can be enhanced by the addition of cations. This is believed to be due to partial neutralisation of the negative charge of SSL at the interphase and thus allowing some oil droplet agglomeration on high shear.

GENERAL FIELD OF INVENTION

This invention relates to artificial creams, in particular to creams which are suitable for use as a coffee whitener, and to emulsifiers for use therein.

Artificial creams intended to replace dairy cream for such culinary purposes as cake and confectionery filling and decoration as well as for whitening coffee, commonly include a protein source, in particular milk protein. Such creams may be prepared from milk powder using less water than is usually required to reconstitute the milk. They usually also contain various combinations of gums and stabilisers, both natural gums and chemical derivatives of natural materials such as cellulose or starch. Methylethylcellulose can be used to replace the protein normally present in creams and still retain good whipping and emulsion stability characteristics by the judicious inclusion where necessary of additional stabilising components and emulsifiers. Hitherto, certain important characteristics were nevertheless lost, including in particular stability at elevated temperatures in hot liquids, apparently due to a decrease in solubility with increase in temperature of methylethylcellulose.

PRIOR ART

U.S. Pat. No. 2,868,653 (1959) relates to a salad and dessert topping containing water, glyceride fat, alkylated cellulose, e.g. methyl cellulose and methylethylcellulose, surfactant selected from the group consisting of complex mixtures of partial esters of fatty acids and hexitol anhydrides derived from sorbitol, complex mixtures of partial esters of fatty acids and sorbitol-derived hexitol anhydrides in which polyoxyethylene chains have been added to the non-esterified hydroxyl groups of the hexitol anhydride, refined complex mixtures resulting from the metathetical reaction of complex glyceride fat with an excess of glycerol, and a mixture of the esters resulting from the direct esterification of fatty acid with polymerised ethylene oxide. These surfactants are of the nonionic type and comprise Spans, Tweens, Vrest, Myverol and Myrj. Lecithin was not mentioned.

Food Technology 22 (June, 1968), 731–744, relates to the role of ingredients in the formulation of whipped toppings. Under the heading Surface Active Agents, on page 736, it is stated that better results are obtained with a blend of lipophilic esters and some hydrophilic surfactant. On page 743 proteinless toppings are described. A more effective (hydrophilic) emulsifying system is recommended, whereas the viscosity can be controlled by adding hydroxylated lecithin.

The use of multiple-component emulsifier systems in artificial creams is widespread, but the combination of the present invention has not hitherto been proposed. Three components are disclosed in British Pat. No. 1,066,703 including sodium caseinate, which is not however recognised in the art as an ionic emulsifier. British Pat. No. 1,256,053 discloses a combination of lecithin with emulsifiers which are either free acids or esters and therefore essentially nonionic. British Pat. No. 1,500,427 also discloses a synthetic cream made by mixing fat and water with lecithin and either polyglycerol fatty acid ester/polyoxyethylene sorbitan fatty acid ester or with monoglyceride, the resulting emulsion being stabilised by direct heat with steam.

Many of the art formulations of artificial creams are intended as toppings and do not meet the more critical requirements for coffee creams to which the present invention is directed, without the presence of non-fat organic milk solids, in particular caseinate.

THE INVENTION

The present invention is based upon a study of the essential properties which protein confers on creams, including in particular their stability in hot coffee, and its replacement by a suitable combination of ingredients having related properties.

The invention therefore provides, in or for artificial creams based on aqueous edible fat dispersions, a replacement composition for the protein usually present in such creams, comprising a mixture of lecithin with an ionic, lipophilic emulsifier, preferably a soluble salt of a long chain alkoxylated hydroxypolycarboxylic food acid and another, nonionic hydrophilic emulsifier comprising a polyoxyalkylene condensate. The long chain contains at least 10 carbon atoms.

The lipophilic emulsifier is more soluble in the fat phase of the cream whereas the hydrophilic emulsifier is more soluble in the aqueous phase. All the emulsifiers must of course be of acceptable food grade. The amount of emulsifiers together in the cream product should be less than 1%, based by weight as are all the percentages and proportions in this specification, on the total composition including water. More particularly a total concentration not exceeding 0.5% but at least 0.01% of the emulsifier mixture is present in the cream compositions of the invention.

Substantially more lecithin must be present for best results than is normally found in natural cream, between 0.02 and 0.1% for preference, more particularly approximately 0.05%. The lecithin nevertheless preferably is present in the least amount of the three emulsifiers, from 1 to 5 to 1 to 10, preferably approximately 1 to 6, with preferably approximately equal amounts of the other two emulsifiers. The lecithin may be derived from soyabean or egg sources and hydrolysed lecithin emulsifiers may be used.

Preferably the polyoxyalkylene condensate is based on a sorbitan ester such as monolaurate or monostearate. The alkylene groups of the condensate are preferably short chain not exceeding three carbon atoms in a condensate unit of a group from 10 to 13 units.

Preferably the salt is a sodium salt, particularly a lactylated stearate, palmitate, laurate or other long chain saturated fatty acid alkoxy group.

Preferably the calculated Hydrophilic-Lipophilic Balance (HLB) of the mixture of emulsifiers is within the range 8–12 on the scale in which a charged species is included, based on Honeywill-Atlas method of HLB determination. This ensures a stable emulsion in both liquid and whipped form. A suitable mixture meeting this requirement is for example polyoxyethylene (20) sorbitan monostearate/sodium stearoyl lactylate/soya lecithin in the weight range 3:3:1 in a concentration from 0.3 to 0.5 wt %, and an apparent HLB value on the above scale of 8–9, but other ratios and concentrations may be used.

Where a whipping cream is specifically required an end-point enhancer and whipped product stabiliser is preferably included, e.g. glyceryl monostearate, at a concentration of from 0.05–0.1 wt % in the product and cations, preferably in the form of sodium, e.g. sodium bicarbonate at approximately 0.05% concentration, that will contribute to improved whipped cream consistency may also be included.

The fat component of the cream compositions of the invention is preferably a vegetable fat, which may be modified by blending, fractionation, hydrogenation or interesterification in accordance with the current practises of the art. Preferably it is a lauric fat although others, particularly palm oil and its derivatives may be suitable. Palm kernel oil is particularly preferred when hydrogenated to a substantially saturated condition, i.e. to an Iodine Value 3 or less. In any event preferably the fat has a slip melting point of 37°–38° C. and approximate solids content values of $N_{20}$ 80%, $N_{30}$ 22%.

The compositions of the invention preferably contain at most 30 wt % of fat especially 15 to 25 wt % fat, compared with not less than 35 wt % milk fat in whipping cream. These lower amounts are used preferably in the presence in the compositions also of a structural agent dispersed in the aqueous phase, usually a gum and preferably xanthan gum, although other structuring agents, e.g. sodium carboxymethylcellulose, sodium alginate or carrageenan gum may also be present, at least 0.1% being preferred, up to 0.3% maximum.

Buffer salts, particularly trisodium citrate and sodium tripolyphosphate aid the performance of the products of the invention as coffee whiteners and inhibit the coagulating effect on any alginate present in the composition of calcium salts in the coffee infusion.

The cream products of the invention may be used as coffee whiteners, pouring creams or as a topping or whipped to a light cream and for other culinary purposes. They provide a cheaper alternative to the natural products and can exhibit superior uniformity of whip. They may be subjected to high temperature sterilisation to enhance the shelf-life of the products.

Preferably the ingredients of the cream products of the invention are assembled in separate fat and aqueous phases which are then put together. The lecithin, alkoxylated polycarboxylic salt and other emulsifiers are dispersed in the melted fat, but the nonionic polyoxyalkylene condensate is dispersed in cold water with suitable agitation, followed by the remaining ingredients, preferably starting with salts followed by alginate, gums and any sodium carboxymethylcellulose required. The aqueous phase is then heated slightly above the melting point of the fat and the two phases mixed together. The mixture is then heated to a pasteurisation temperature, cooled somewhat and homogenised before being finally cooled for packaging purposes. Pasteurisation may be effected by direct heating with steam for limited periods.

EXAMPLE

The following ingredients were assembled as above described, in separate phases comprising cold town water and fat at 50° C.:

| Ingredient | % | |
|---|---|---|
| Manucol MHA (sodium alginate) | 0.15 | |
| Sugar (sucrose) | 1.5 | |
| Trisodium citrate | 0.1 | |
| Sodium tripolyphosphate | 0.25 | Aqueous phase |
| Xanthan gum | 0.15 | |
| Tween 60 | 0.15 | |
| Water | 72.19 | |
| Hydrogenated palm kernel oil | 25.2 | |
| Sodium stearoyl lactylate | 0.15 | Oil phase |
| Lecithin | 0.045 | |
| Glyceryl monostearate | 0.075 | |
| Permitted colour and flavour | 0.04 | |

The mixture of two phases was heated to 77° C. and maintained at this temperature for pasteurisation purposes for ten minutes before being cooled to 50° C. and homogenised at 200-250 kgms/cm$^2$. The product was finally cooled to 5°–10° C. and was suitable as a coffee whitener or for pouring cream and could be whipped to an overrun of 100-250%, stable for 2 hours, using standard mechanical whipping machines. The product exhibited a pleasant mouth-feel and light texture.

What is claimed is:

1. A whippable oil-in-water artificial cream emulsion composition having improved solubility in hot coffee comprising:
   (a) an aqueous dispersion essentially free from protein and cellulose derivatives containing 15% to 25% by weight of a vegetable fat having a slip melting point of 37° to 38° C. and approximately solids content value of $N_{20}$ 80%, $N_{30}$ 22%, selected from palm and lauric fats and their derivatives; and
   (b) an effective amount of from about 0.01% to about 0.5% by weight of the composition of a non-alphatending emulsifier composition comprising from about 10% to about 20% by weight of said emulsifier composition of lecithin, the balance a mixture of ionic and nonionic emulsifiers providing an HLB factor of 8 to 12 in the emulsifier composition and consisting essentially of a lactylated alkali metal salt of a fatty acid and a polyoxyalkylene condensate sorbitan ester of a saturated monocarboxylic acid containing from 14 to 18 carbon atoms wherein said polyoxyalkylene condensate contains from about 10 to about 20 alkylene groups each containing up to about 3 carbon atoms.

2. A composition according to claim 1 wherein said salt and ester are present in approximately equal amounts.

3. Method of preparing an artificial cream composition comprising:
   (a) melting an edible vegetable fat having a slip melting point of 37° to 38° C. and selected from palm oil, lauric fats and their derivatives;
   (b) dispersing lecithin and an anionic emulsifier in the melted fat;
   (c) dispersing a nonionic emulsifier in an aqueous phase essentially free from cellulosic derivatives and protein;
   (d) dispersing the fat phase in the aqueous phase in an amount from 15% to 25% by weight of the total composition; and
   (e) homogenizing and heat pasteurizing the resulting emulsion thereby produced, the amount of lecithin and other emulsifiers providing from about 0.01% to about 0.5% by weight of the total composition of which from about 10 to about 20 by weight is lecithin, each of the anionic and nonionic emulsifiers being present in greater amounts than the lecithin and providing an HLB factor in admixture therewith of from 8 to 12, the anionic and nonionic emulsifiers consisting essentially of a lactylated alkali metal salt of fatty acids and a polyoxyalkylene condensate sorbitan ester of a saturated monocarboxylic acid containing from 14 to 18 carbon atoms wherein said polyoxyalkylene condensate contains from about 10 to about 20 alkylene groups each consisting up to about 3 carbon atoms.

4. A whippable oil-in-water artificial cream emulsion composition having improved solubility in hot coffee comprising:
   a. an aqueous dispersion essentially free from protein and cellulose derivatives and containing at least 15% vegetable fat; and
   b. an effective amount of from about 0.01% to about 0.5% by weight of the composition of a non-alphatending emulsifier composition comprising from about 10% to about 20% by weight of said emulsifier composition of lecithin, the balance a mixture of ionic and non-ionic emulsifiers providing an HLB factor of 8 to 12 in the emulsifier composition and consisting essentially of a lactylated alkali metal salt of a fatty acid and a polyoxyalkylene sorbitan ester of a monocarboxylic acid containing 12 to 18 carbon atoms wherein said polyoxyalkylene sorbitan ester contains from about 10 to about 20 alkylene groups each containing up to about 3 carbon atoms.

5. A whippable oil-in-water artificial cream emulsion composition according to claim 4 wherein said salt and ester are present in approximately equal amounts.

6. A whippable oil-in-water artificial cream emulsion composition according to claim 4 wherein the vegetable fat has a slip melting point of 37° to 38° C. and approximately solids content value of $N_{20}$ 80%, $N_{30}$ 22%.

7. Method of preparing an artificial cream composition comprising:
   a. melting an edible vegetable fat;
   b. dispersing lecithin and an anionic emulsifier in the melted fat;
   c. dispersing a nonionic emulsifier in an aqueous phase essentially free from cellulosic derivatives and protein;
   d. dispersing the fat phase in the aqueous phase in an amount of at least 15% by weight of the total composition; and e. homogenizing and heat pasteurizing the resulting emulsion thereby produced, the amount of lecithin and other emulsifiers providing from about 0.01% to about 0.5% by weight of the total composition of which from about 10 to about 20% by weight is lecithin, each of an anionic and nonionic emulsifiers being present in greater amounts than the lecithin and providing an HLB factor in admixture therewith of from 8 to 12, the anionic and nonionic emulsifiers consisting essentially of a lactylated alkali metal salt of a fatty acid and a polyoxyalkylene sorbitan ester of a saturated monocarboxylic acid containing from 12 to 18 carbon atoms wherein said polyoxyalkylene condensate contains from about 10 to about 20 alkylene groups each consisting up to about 3 carbon atoms.

8. Method of preparing an artificial cream composition according to claim 7 wherein the vegetable fat has a slip melting point of 37° to 38° C. and approximately solids content value of $N_{20}$ 80%, $N_{30}$ 22%.

* * * * *

UNITED STATES PATENT AND TRADEMARK OFFICE
CERTIFICATE OF CORRECTION

PATENT NO. : 4,360,535

DATED : November 23, 1982

INVENTOR(S) : Darling et al

It is certified that error appears in the above-identified patent and that said Letters Patent are hereby corrected as shown below:

Claim 3, line 18, "from about 10 to about 20"

should read --from about 10 to about 20%--.

Signed and Sealed this

Seventh Day of June 1983

[SEAL]

Attest:

DONALD J. QUIGG

Attesting Officer     Acting Commissioner of Patents and Trademarks